Feb. 14, 1956    J. C. BELLAMY    2,734,606
CAPSTAN CLUTCH
Filed April 28, 1951
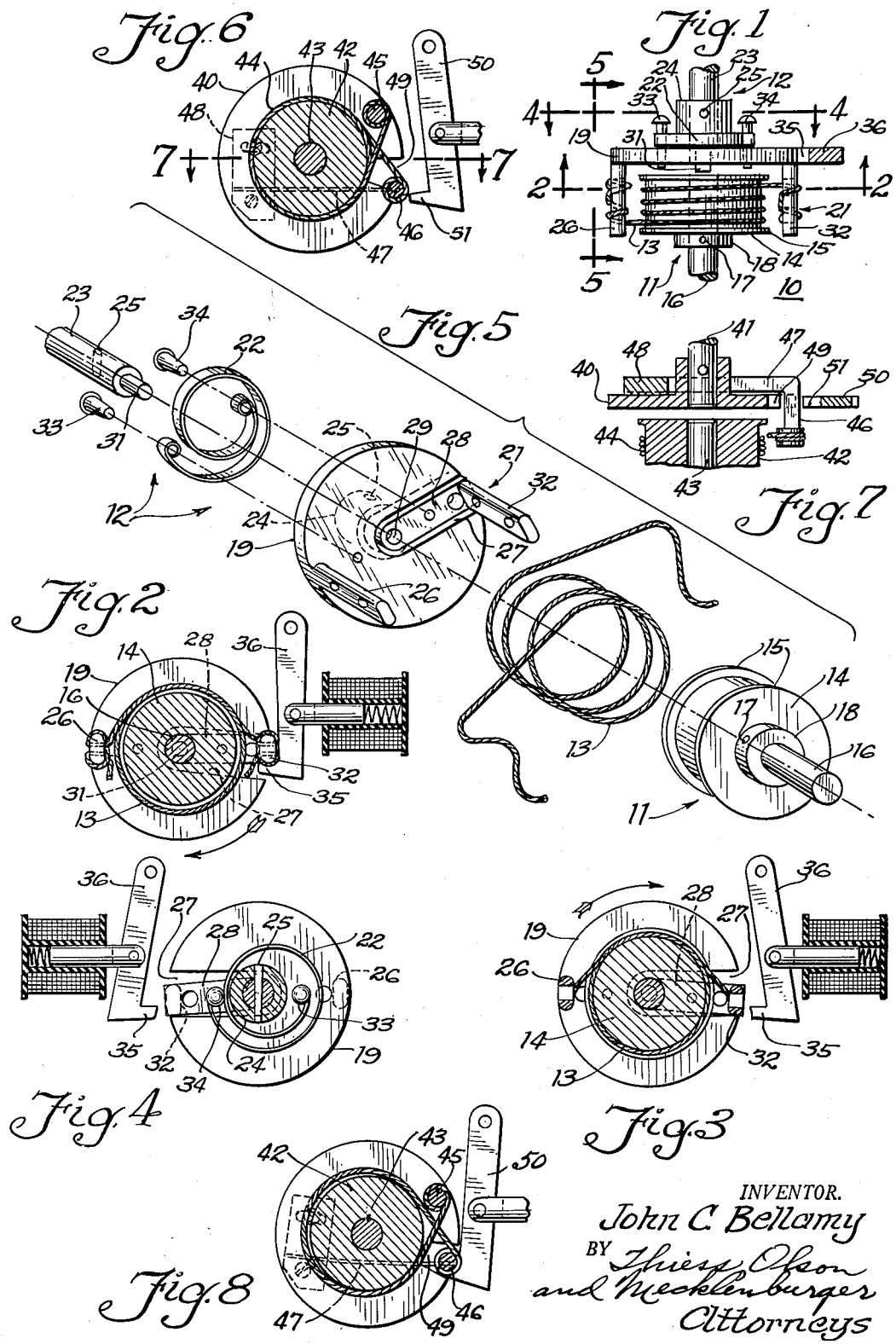
INVENTOR.
John C. Bellamy
BY Thiess Olson
and Mecklenburger
Attorneys

United States Patent Office 2,734,606
Patented Feb. 14, 1956

2,734,606

CAPSTAN CLUTCH

John C. Bellamy, Chicago, Ill., assignor to Cook Electric Company, Chicago, Ill., a corporation of Illinois Application April 28, 1951, Serial No. 223,537

17 Claims. (Cl. 192—81)

This invention relates to friction clutches, more particularly to friction clutches of the capstan type, that is, a clutch wherein the driving and the driven member are connected by a relatively flexible cord or similar member, and it is an object of the invention to provide improved apparatus of this character.

It is a further object of the invention to provide improved apparatus of the character indicated which is simple in form and easy to operate.

It is a further object of the invention to provide improved apparatus of the character indicated which requires only a very small force to effect driving engagement.

It is a further object of the invention to provide improved apparatus of the character indicated in which there is little variability in the time interval between initiation of clutching and actual clutching.

It is a further object of the invention to provide a capstan clutch of the character indicated embodying improved means for providing engagement between the driving and the driven members.

In carrying out the invention in one form, a capstan clutch is provided comprising, a driving member including drum means having an axis, a relatively nonextensible cord means spirally wrapped around the drum means, a driven member axially mounted with respect to the driving member, the cord having two ends one of which is attached to the driven member, means rotatable with the driven member and pivotable relative to the axis, the other end of the cord being attached to the rotatable means whereby pivotal movements thereof in the direction of clutch rotation effect tightening of the cord, spring means associated with the driven member for urging the rotatable means in the cord tightening direction, and external means for engaging the rotatable means and effecting movement of the rotatable means in opposition to the spring means for releasing the driven member from the driving member.

For a more complete understanding of the invention, reference should be had to the accompanying drawing in which:

Figure 1 is a top plan view of apparatus embodying the invention;

Fig. 2 is a sectional view taken substantially in the direction of arrows 2—2 showing the clutch in the unengaged position;

Fig. 3 is a view similar to Fig. 2, but showing the clutch in the engaged position;

Fig. 4 is a sectional view taken substantially in the direction of arrows 4—4, and showing the clutch in the engaged position;

Fig. 5 is an exploded perspective view of the parts comprising the invention;

Fig. 6 is a sectional view similar to Fig. 3 of a modified form of the invention, the clutch being shown in the engaged position;

Fig. 7 is a transverse sectional view taken substantially along lines 7—7 of Fig. 6, and Fig. 8 is a sectional view similar to Fig. 6 showing the clutch in the unengaged position.

Referring to the drawings, the invention is shown embodied in a capstan clutch 10 comprising a driving member 11, a driven member 12, and a cord 13 for interconnecting them.

The driving member comprises a drum 14 which may include flanges 15 at each side, the drum being mounted on a shaft 16 which is adapted to be connected to the prime mover, such as an electric motor for example. The drum 14 may be attached to shaft 16 in any desired manner, such for example as by a pin 17 passing through corresponding openings in the shaft 16 and a hub attached to the drum.

The driven member 12 may comprise a clutch frame 19, a clutch lever 21, an actuating spring 22, and a shaft or support member 23. A bushing 24 adapted to receive one end of the shaft 23 may be integral with the clutch frame and centrally disposed thereof, and a pin or the like 25 may be provided for attaching the shaft to the hub. Extending substantially at right angles to the body plane of clutch frame 19 is a finger 26, which finger may be integral with the clutch frame or otherwise rigidly attached thereto. A radial slot 27 is provided in the body of clutch frame 19, and within the radial slot the arm 28 of the clutch lever 21 is disposed. The arm 28 includes an opening 29 at its inward end which is adapted to relatively loosely receive the reduced end 31 of the shaft 23, thereby pivotally mounting the clutch lever 21 relative to the axis of shaft 23 and of the clutch frame 19. The width of arm 28 is less than the width of slot 27 so that clutch lever 21 can pivot a small distance within the slot. Extending perpendicularly to the plane of arm 28 is a finger 32, and the slot 27 being diametrically disposed with respect to finger 26, the finger 32 is diametrically opposite to finger 26. While this may be a preferred form of the invention, it will be understood that the slot 27 may extend radially in directions other than the one shown.

The spring 22, in a preferred form of the invention, may be a coiled flat spring, as shown, disposed around hub 24 and having its two ends connected respectively to pins 33 and 34, the pin 33 being tightly received in an opening provided in the body of clutch frame 19, and pin 34 being tightly received in the corresponding opening provided in the arm 28 of clutch lever 21. As viewed in the drawings, the spring 22 is so biased as to urge clutch lever 21 toward the position shown in Fig. 3. Other forms of springs, and other forms of attaching the ends of the spring to the respective members may of course be used without departing from the spirit and scope of the invention.

Each of the fingers 26 and 32 is provided with openings, as shown, through which are received in any suitable manner the ends of cord 13. Thus in the assembled form one end of cord 13 may be received in the openings in finger 26 and tied to the finger, the cord may be wrapped around a drum 14 the requisite number of times, and the other end of the cord may be attached to the arm 32 by means of the openings provided therein. Notches, for example, instead of openings may be provided on fingers 26 and 32, and any form of knotting, clamps, etc. may be used for attaching the ends of the cord to the respective fingers. It is essential that the length of the cord be chosen such that in addition to the turns around the drum, the cord may be tightened by the limited movement of the clutch lever 21 in slot 27. The cord 13 must be substantially nonextensible such, for example, as cords made out of braided or coiled glass filaments, generally known as spun glass, or perhaps metallic filaments. The coefficient of friction of the cord material relative to the drum material is not critical since a large number of convolutions of the cord 13 may be chosen.

In order to have little variability in the time necessary for the clutch to engage, the amount of movement of clutch lever 21 shall be small, and in order that the amount of force necessary to produce gripping of the drum 14 by the cord 13 be small, a relatively large number of convolutions are chosen. Since the cord is substantially nonextensible, the clutch engages in the time in which it takes the spring to move the lever 21 to tighten the cord around the drum. In any event, the total movement is no greater than the difference in the widths of the slot 27 and arm 28. This difference preferably shall be made small, for example, in one clutch which embodied the invention, the difference was about one-sixteenth of an inch. Since the time necessary for spring 22 to move arm 28 this small distance is always substantially the same, the clutching time of the device is substantially constant. The cord 13 must be sufficiently nonextensible so that gripping of the drum occurs with such small movements of arm 28. The cord must also have sufficient strength to withstand the forces to be used.

The outside of finger 26 may be flush with the outside surface of the body of clutch frame 19, but the outer end of arm 28 extends slightly beyond the perimeter of the body of clutch frame 19 in order that it may be engaged by the pawl 35 of the lever 36. The lever 36 may be spring biased inwardly, as seen in Figs. 2 and 3, and may be adapted to be moved outwardly by a solenoid, for example.

Assuming that the drum 14 is rotating and that the lever 36 has not been actuated outwardly, the operative relationship of the parts may be as viewed in Fig. 2. The pawl 35 lies between the lower surface of arm 28 and the lower surface of slot 27 thereby holding the clutch frame 19 of the driven member 12 stationary. The pawl 35 is urged into this position by the spring associated with the solenoid. In this manner the driven member 12 is prevented from rotating backwards under the influence of spring 22 whenever the clutch is disengaged. In Fig. 2 the cord 13 is shown spaced away from drum 14 for clarity. Actually, the cord lies closely against the surface of the drum. The tendency of the drum 14 is to move the clutch frame 19 with it due to friction between the cord 13 and the surface of the drum. Due to the fact that the pawl 35 holds the arm 28 so that it cannot pivot, the cord 13 cannot tighten around the drum. The driven member 12, of course, cannot rotate so long as the pawl 35 is engaged underneath the arm 28.

When, however, the solenoid for actuating the lever 36 is energized, the lever 36 is pulled away whereby the pawl 35 moves out of the space between arm 28 and the lower edge of slot 27 and releases the arm 28. At this instant the spring 22 causes the clutch lever 21 to pivot downwardly about the end 31 of shaft 23 whereby the clutch lever 21 assumes the position shown in Fig. 3. The slight movement of the clutch lever as viewed between Figs. 2 and 3 is sufficient to cause the cord 13 to tightly grip the surface of drum 14 whereupon the drum 14 drives the driven member 12. This driving will continue until the lever 36 is released such as by de-energizing of the solenoid whereupon the lever will move inwardly until the pawl 35 engages the perimeter of the body of the clutch frame. (The lever 36 may be disposed in the plane of the body of the clutch frame.) The pawl 35 will ride on the perimeter until the clutch arm moves around sufficiently to engage the pawl and move the clutch arm upwardly to the position shown in Fig. 2 with the pawl in the slot as shown, thereby releasing the tension in the cord, effecting disengagement of the driving and the driven members and preventing either forward or rearward movement of the driven member. Fig. 4 illustrates the engaging position of the arm 28 when the reverse view of the parts is taken, i. e. direction of arrows 4—4.

It will be apparent that if the solenoid is energized and de-energized sufficiently quick, the clutch may become a one-turn clutch since the pawl 35 will move outwardly to effect engagement of the driving and driven members and will move inwardly to effect disengagement thereof after substantially one revolution.

The shafts 16 and 23 may be the shafts supported by the prime mover, for example a motor, and the driven member, for example a gear train, thereby obviating the necessity for providing supporting bearings for the clutch as such. This may be the form of construction envisioned by the drawings wherein no supporting bearings are shown. It will be understood, however, that the clutch device itself may be provided with a separate frame providing bearings for suporting the shafts 16 and 23.

Referring to Figs. 6, 7, and 8 of the drawings, there is shown a modified form of the invention which differs from the form already described, mainly in the manner of effecting engagement of the clutch. In these figures there is shown a clutch frame 40 which comprises mainly a disc mounted for rotation on a shaft 41 and a driving cylinder 42 which is adapted to be mounted upon a shaft 43. A nonextensible cord 44 similar to cord 13 is attached at one of its ends to the disc 40 by means of a pin 45, is wrapped around the drum 42 an appropriate number of times and has its other end attached to a transverse member 46 on a cantilever spring member 47. The cantilever spring member 47 is mounted upon the disc member 40 in any suitable manner and preferably is attached thereto by means of an adjustable bracket 48. The spring member 47 may be mounted anywhere upon the disc 40 so long as it tends to bias the cord 44 in the tightening direction whereby the drum 42 may drive the disc member 40. The disc member 40 may include a slot 49 at one side thereof within which the transverse member 46 of the spring member may be disposed. Disposed adjacent the slot 49 is a lever 50 having a pawl 51 at its lower end which pawl is engageable with the under side of transverse member 46 and in between the under side of transverse member 46 and the lower edge of slot 49. A spring member and solenoid may be associated with the lever 50 as has already been described in connection with the other figures whereby the pawl 51 is utilized to stop rotation of the clutch and to prevent backing up of the disc 40.

In the engaged position shown in Figs. 6 and 7 the lever 50 is in its outward position and in this position the spring 47 has tightened the cord and rotation of the clutch may take place. When the lever 50 is released and it moves inwardly to ride upon the periphery of disc member 40 the transverse member 46 of the spring will engage the pawl thereby causing the leaf spring to assume a position such as is shown in Fig. 8. In this position the cord is loosened, and the clutch is disengaged and held from rotating by the pawl 51.

Other forms of structure for preventing rearward rotation of the driven member when the clutch is unengaged may be used if desired.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. An externally controllable capstan clutch comprising, a driving member including drum means having an axis, cord means spirally wrapped around said drum means, a driven member axially mounted with respect to said driving member, said cord having two ends one of which is attached to said driven member, and externally controllable actuating means having one extremity mounted on said driven member and the other of said cord ends secured to the free extremity of said actuating means so that circumferential movement of the free extremity of said actuating means will cause engagement of said driving member and said cord means, said actuating means being urged to a position effecting engagement of said driving means and said cord means.

2. An externally controllable capstan clutch comprising, a driving member including drum means having an axis, a relatively nonextensible cord means spirally wrapped around said drum means, a driven member axially mounted with respect to said driving member, said cord having two ends one of which is attached to said driven member, and actuating means having one extremity secured to said driven means and the other extremity receiving the other of said cord ends so that circumferential movement of said other extremity causes said cord to tighten for driving engagement of said driving member and said cord means, said actuating means having a portion thereof peripherally disposed on said driven member and engageable to effect clutch disengagement said actuating means comprising a resilient arm extending radially from said driven means and urging said cord means into engagement with said drum means.

3. A capstan clutch controllable by external means comprising, a driving member including drum means having an axis, a relatively nonextensible cord means spirally wrapped around said drum means, a driven member axially mounted with respect to said driving member, said cord having two ends one of which is attached to said driven member accessible for engagement by such external means, means rotatable with said driven member and pivotable relative to said axis, the other end of said cord being attached to said rotatable means whereby pivotal movements thereof in the direction of clutch rotation effect tightening of said cord on said driving means, and means associated with said driven member for urging said rotatable means in said cord tightening direction.

4. A capstan clutch comprising, a driving member including drum means having an axis, a relatively nonextensible cord means spirally wrapped around said drum means, a driven member axially mounted with respect to said driving member, said cord having two ends one of which is attached to said driven member, means rotatable with said driven member and pivotable relative to said axis, the other end of said cord being attached to said rotatable means whereby pivotal movements thereof in the direction of clutch rotation effect tightening of said cord on said driving means, means associated with said driven member for urging said rotatable means in said cord tightening direction, and external means for engaging said rotatable means and effecting movement thereof in opposition to said urging means for releasing said driven member from said driving member.

5. A capstan clutch controllable by external means comprising, a driving member including drum means having an axis, a relatively nonextensible cord means spirally wrapped around said drum means, a driven member axially mounted with respect to said driving member, said cord having two ends one of which is attached to said driven member, actuating means rotatable with said driven member and pivotable relative to said axis, the other end of said cord being attached to said rotatable means whereby pivotal movements thereof in the direction of clutch rotation effect tightening of said cord on said driving means, spring means associated with said driven member for urging said rotatable means in said cord tightening direction, and external means for engaging said rotatable actuating means and effecting movement of said rotatable means in opposition to said spring means for releasing said driven member from said driving member.

6. A capstan clutch controllable by external means comprising, a driving member including drum means having an axis, a relatively nonextensible cord means spirally wrapped around said drum means, a driven member axially mounted with respect to said driving member, said driven member including means extending along said drum means and to which one end of said cord is attached, means rotatable with said driven member and pivotable relative to said axis, said rotatable means including a member extending along said drum means and to which the other end of said cord is attached whereby pivotal movements of said rotatable means in the direction of clutch rotation effect tightening of said cord on said driving means, spring means associated with said driven member for urging said rotatable means in said cord tightening direction, and external means for engaging said rotatable means and effecting movement of said rotatable means in opposition to said spring means for loosening said cord.

7. An externally controllable capstan clutch comprising, a driving member including drum means having an axis, a relatively nonextensible cord means spirally wrapped around said drum means, a driven member including frame means axially mounted with respect to said drum means, an arm extending from said frame and lying along said drum, one end of said cord being attached to said arm, said frame including guide means, clutch operating means mounted in said guide means whereby pivotal movements about said axis of said clutch operating means may occur, said clutch operating means including an arm extending along said drum and to which the other end of said cord is attached, said cord having a length between said arms whereby pivotal movement of said clutch operating means in the direction of clutch rotation tightens said cord and effects clutch engagement and pivotal movement in the reverse direction effects loosening of said cord and clutch disengagement, spring means attached to said frame means and said clutch operating means for urging said clutch operating means in the cord tightening direction, and external means for engaging said clutch operating means and effecting movement thereof in opposition to said spring means for loosening said cord.

8. An externally controllable capstan clutch comprising, a driving member including drum means having an axis, a relatively nonextensible cord means spirally wrapped around said drum means, a driven member including a base plate axially mounted with respect to said drum means, an arm extending from said base plate and lying along said drum, one end of said cord means being attached to said arm, said base plate including a radially-extending groove, a clutch operating lever mounted in said groove whereby limited pivotal movements of said clutch lever about said axis may occur, said clutch lever including an arm extending along said drum and to which the other end of said cord means is attached, said cord means having a length between said arms whereby pivotal movement of said clutch lever in the direction of clutch rotation tightens said cord and effects clutch engagement and pivotal movement in the reverse direction loosens said cord means and effects clutch disengagement, spring means attached to said base plate and said clutch lever for urging said clutch lever in the direction of tightening said cord means, and external means for engaging said clutch lever and effecting movement thereof in opposition to said spring means for loosening said cord.

9. An externally controllable capstan clutch comprising, a driving member including drum means having an axis, cord means spirally wrapped around said drum means, a driven member including a base plate axially mounted with respect to said drum means, an arm extending from said base plate and lying along said drum, one end of said cord means being attached to said arm, said base plate including a radially-extending groove, a clutch operating lever mounted in said groove whereby limited pivotal movements of said clutch lever about said axis may occur, said clutch lever including an arm extending along said drum and to which the other end of said cord means is attached, said cord means having a length between said arms whereby pivotal movement of said clutch lever in the direction of clutch rotation tightens said cord and effects clutch engagement and pivotal movement in the reverse direction loosens said cord means and effects clutch disengagement, spring means attached to said base plate and said clutch lever for urging said clutch lever in the direction of tightening said cord means, and external means for engaging said clutch lever and effecting movement thereof in opposition to said spring means for loosening said cord.

10. A capstan clutch controllable by external means comprising, a driving member including drum means having an axis, cord means spirally wrapped around said drum means, a driven member axially mounted with respect to said driving member, said cord having two ends one of which is attached to said driven member, actuating means attached to said driven member and having a free end, the other one of the ends of said cord means being attached to said free end, said actuating means being resiliently biased to tighten said cord means and engageable by such external means to effect clutch disengagement.

11. A capstan clutch controllable by external means comprising, a driving member including drum means having an axis, cord means spirally wrapped around said drum means, a driven member axially mounted with respect to said driving member, said cord having two ends one of which is attached to said driven member, a leaf spring member attached at one end to said driven member and having a free end, the other one of the ends of said cord means being attached to said free end, said resilient member being biased to tighten said cord means and engageable by such external means to effect clutch disengagement.

12. An externally controllable capstan clutch comprising, a driving member including drum means having an axis, cord means spirally wrapped around said drum means, a driven member axially mounted with respect to said driving member, said cord having two ends one of which is attached to said driven member, actuating means attached to said driven member and having a free end, the other one of the ends of said cord means being attached to said free end, said actuating means being resiliently biased to tighten said cord means, and external means for engaging said actuating means and effecting movement thereof in opposition to said bias, said external means including means for holding said driven member from rotation in either direction.

13. A capstan clutch controllable by external means comprising, a driving member including drum means having an axis, a relatively nonextensible cord means spirally wrapped around said drum means, a driven member axially mounted with respect to said driving member, said cord having two ends one of which is attached to said driven member, and actuating means mounted on said driven member and rotatable therewith, portions of said actuating means being movable about said axis with respect to said driven means and engageable by such external control means, the other of said cord ends being secured to the relatively movable portions of said actuating means so that such relative movement will cause said cord to effect driving engagement of said driven and driving members said actuating means being urged in a direction to effect driving engagement of said driven and driving members.

14. A capstan clutch controllable by external means comprising, a driving member including drum means having an axis, a relatively nonextensible cord means spirally wrapped around said drum means, a driven member axially mounted with respect to said driving member, said cord having two ends one of which is attached to said driven member, and actuating means mounted on said driven member and rotatable therewith, portions of said actuating means being movable about said axis with respect to said driven member engageable by such external control means and resiliently biased in the direction of rotation of said driven member, the other of said cord ends being secured to the relatively movable portions of said actuating means so that such relative motion will cause said cord to effect driving engagement of said driven and driving members.

15. A capstan clutch controllable by external means comprising, a driving member including drum means having an axis, nonextensible cord means spirally wrapped around said drum means, a driven member axially mounted with respect to said driving member, said cord having two ends one of which is attached to said driven member, actuating means attached to said driven member and having a free end, the other one of the ends of said cord means being attached to said free end, said actuating means being resiliently biased to tighten said cord means, and external means for engaging said actuating means and effecting movement thereof in opposition to said bias.

16. A capstan clutch controllable by external means comprising a driving member including drum means having an axis, nonextensible cord means spirally wrapped around said drum means, a driven member axially mounted with respect to said driving member, said cord having two ends one of which is attached to said driven member, actuating means attached to said driven member and having a free end, the other one of the ends of said cord means being attached to said free end, said actuating means resiliently biased to tighten said cord means on said drum means, and a nonrotatable detent engageable with said actuating means for effecting movement thereof in opposition to said bias.

17. A capstan clutch controllable by external means comprising a driving member including drum means having an axis, nonextensible cord means spirally wrapped around said drum means, a driven member axially mounted with respect to said driving member, said cord having two ends one of which is attached to said driven member, actuating means attached to said driven member and having a free end, the other one of the ends of said cord means being attached to said free end, said actuating means resiliently biased to tighten said cord means on said drum means, and a nonrotatable solenoid operated detent engageable with said actuating means for effecting movement thereof in opposition in said bias.

References Cited in the file of this patent

UNITED STATES PATENTS

| 881,028 | Robinson | March 3, 1908 |
| 1,561,537 | Hayes | Nov. 17, 1925 |

FOREIGN PATENTS

| 433,084 | Germany | Aug. 20, 1926 |